(12) United States Patent
Robertsson

(10) Patent No.: US 6,331,382 B1
(45) Date of Patent: Dec. 18, 2001

(54) METHOD OF FABRICATING MIRRORS IN POLYMER WAVEGUIDES

(75) Inventor: Mats Robertsson, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/263,522

(22) Filed: Mar. 5, 1999

(30) Foreign Application Priority Data

Mar. 6, 1998 (SE) .................................................... 9800756

(51) Int. Cl.$^7$ ...................................................... G02B 6/42
(52) U.S. Cl. ................... 430/321; 430/945; 219/121.69; 219/121.68; 385/40; 385/48; 385/52
(58) Field of Search ............................ 430/34, 945, 320; 219/121.6, 162.68, 121.69; 395/39, 47, 48, 50, 40, 52, 31

(56) References Cited

U.S. PATENT DOCUMENTS

| | | |
|---|---|---|
| 5,327,415 | 7/1994 | Vettiger et al. ........................ 369/121 |
| 5,367,585 * | 11/1994 | Ghezzo et al. .......................... 385/23 |
| 5,393,371 * | 2/1995 | Chang et al. .................... 219/121.69 |
| 5,544,268 * | 8/1996 | Bischel et al. ............................ 385/4 |
| 5,909,524 * | 6/1999 | Tabuchi .................................. 385/49 |
| 6,049,641 * | 4/2000 | Deacon et al. .......................... 385/15 |

FOREIGN PATENT DOCUMENTS

2100876 * 1/1983 (GB) .

OTHER PUBLICATIONS

Hornak, Lawrence, "Polymers for Lightwave and Integrated Optics", Marcell Dekker, Inc. New York, 1992, Chapter 9.

Boström, Gunnar, "Wave grating couplers", Royal Institute of Technology, Stockholm, Trita, Phys 2138, Sep. 15, 1994.

Robertsson, et al., "New Patternable Dielectric and Optical Materials for MCM–L/D–ad o/e–MCM–packaging", First IEEE Int. Symp. On Polymeric Electronics packaging, Oct. 26–30, 1997, Norrköping, Sweden.

* cited by examiner

Primary Examiner—Martin Angebranndt
(74) Attorney, Agent, or Firm—Burns, Doane, Swecker & Mathis, L.L.P.

(57) ABSTRACT

The position of an oblique mirror structure inside a polymer waveguide in relation to an optical device is accurately defined by using an integrated mask of metal, which is defined using photolithography, on top of the waveguide structure. When irradiating the surface of the waveguide with laser light, it is only let through where no metal is left, so that the recess formed is defined by edges of strips of the metal layer. In the same metal layer also electrical contact pads are produced used for self-aligning flip-chip mounting of devices such as lasers and photodiodes. Another metal layer can be applied inside the waveguide structure at a place under the waveguide core so that it is hit by and stops the laser light. The energy of the laser light will atomize the metal and the dispersed metal will then be deposited on the walls of the recess.

6 Claims, 4 Drawing Sheets

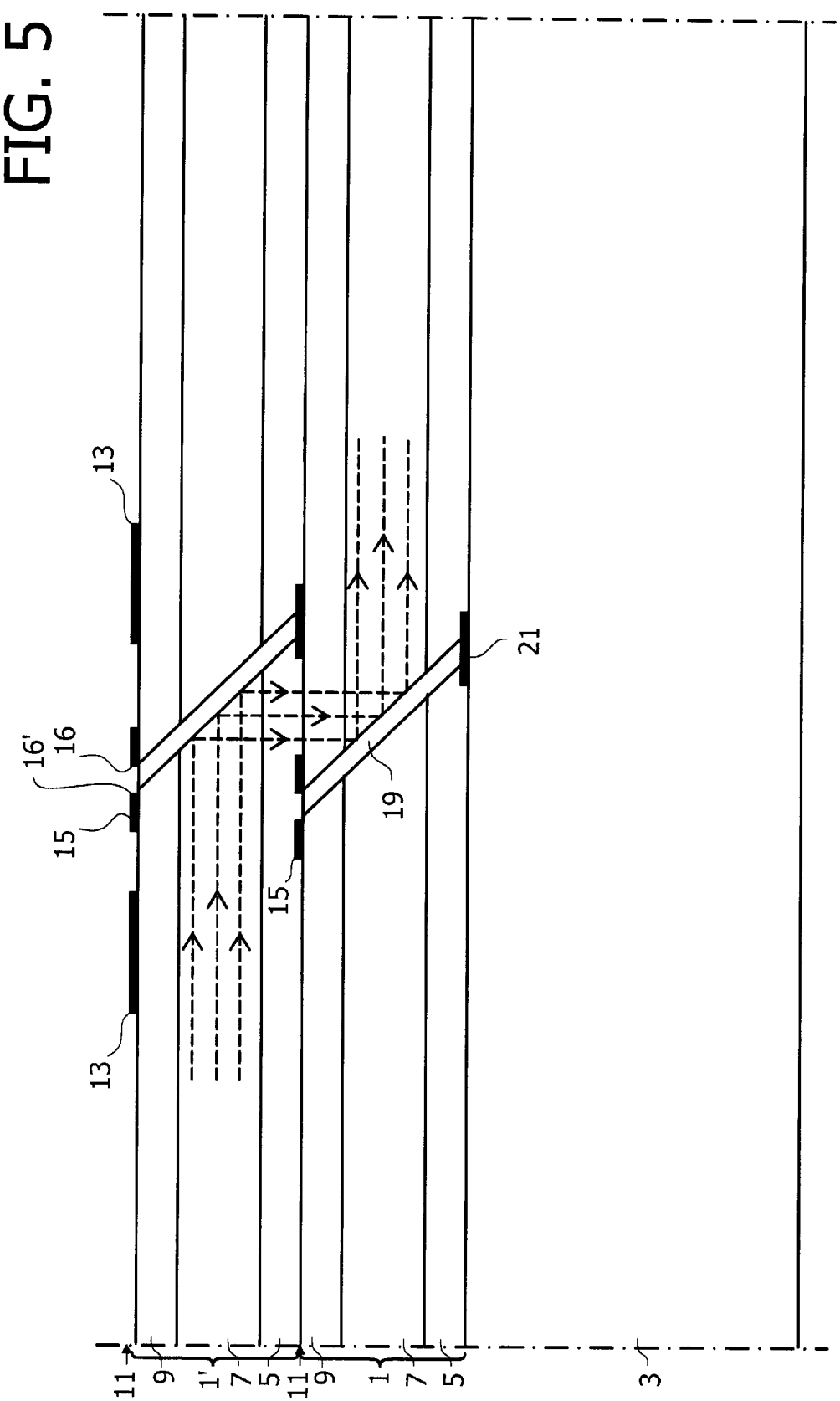

METHOD OF FABRICATING MIRRORS IN POLYMER WAVEGUIDES

The present invention relates to methods of fabricating mirrors in polymer waveguides.

BACKGROUND

Telecommunication systems using light propagating in different waveguides expand more and more today. There is a large interest in extending the optical networks even up to private homes and local business estates, the so called local access network which is also called "Fibre To (In/From) the Home", "Fibre To (In/from) the Customer (Business)", etc. Also, there is a large interest in extending the use of optical networks in LANs, i.e. local area networks, used for interconnecting computers in a business estate and furthermore for communication inside computer equipment and for communication between computers and peripheral devices such as printers etc. In order to achieve this expansion, the costs of the components of the optical networks of course have to be reduced as much as possible. Very important costs are related to producing the optical transmitter and receiver modules including lasers, LEDs, etc. and other active or passive is devices.

In optical transmitter and receiver modules and other optical products which have integrated waveguides for light there is a need for mirrors which can reflect light or generally make a abrupt change of the direction of light propagated in the optical waveguides such as to deflect the light out of a waveguide to some receiver. Mirrors which can generally be formed by end surfaces of optical waveguides can be produced using different methods. Mirrors in the waveguide plane achieving a reflection at a surface to air has been disclosed by Honeywell, for example for creating sharp 90° bends in a waveguide, and mirrors for deflecting light out of a waveguide plane have been disclosed by Dupont and IBM, see for example Lawrence A. Hornack, editor "Polymers for lightwave in integrated optics", Marcel Decker K. K., New York, 1992, Chapter 9 by B. Booth, Dupont. In the company Ericsson, he department MIRC has in cooperation with the Institute for Optical Research disclosed mirrors in waveguides for defecting out of a waveguide plane produced by means of an UV-excimer laser, see Gunnar Boström, "Waveguide grating couplers", graduate report at the Royal Institute of Technology, Stockholm, Trita. Phys. 2138, Sep. 15, 1994.

In U.S. Pat. No. 5,327,415 a method of producing a reflector for a laser in a semiconductor material is described, see FIGS. 2a–2c. A metal mask having 28, 34 defines the opening of the reflector at the surface of the material.

SUMMARY

It is an object of the invention to provide a method providing an accurate positioning of an optoelectrical device or chip to be correctly coupled to a channel-type waveguide formed in the surface layer of a substrate.

It is a further object of the invention to provide a method for positioning an optoelectrical device in relation to a reflector formed in the surface layer of a substrate.

It is a firer object of the invention to provide a method for making a reflector in an optical waveguide allowing a simulation of reflecting surfaces.

Thus the position of an oblique mirror structure inside a polymer waveguide is accurately defined by using an integrated mask of metal, which is defined using photolithography, on top of the waveguide structure. The metal mask only lets the laser light through where material is to be removed, i.e. ablated, in order to manufacture or several mirrors. The need for a high accuracy of the position in space of the laser radiation beam can be reduced since in the lithographic may which defines the metal mask intended for producing the reflector also a pattern can be included defining the contact pads intended for flip-chip mounting of lasers and photodiodes. Self-aliging flip-chip mounting comprising soldering isles allows a very accurate positioning of the optocomponents which will then have a correct location in relation to the mirror obtained. The edge inside the integrated metal mask, which defines the position of the reflecting surface can be a straight line or be curved, for example having a parabolic profile, in it order that more light which diverges from e.g. a laser diode will be collected in the waveguide structure or that light from the waveguide will be better focused on for example the input surface of a photodiode.

Another metal layer can be applied directly under the undercladding or even at a suitable place under the waveguide core in order to use this for metallizing the mirror surface. Then the metaling of the surfaces which will form the mirrors is made in the same process and directly after the cavity being made, when the radiation beam reaches this metal surface. The laser beam will then also affect this inner metal layer but at a substantially lower velocity than the polymer material. Metal will then be removed in a very finely divided form having a high velocity of the particles therein. They will then deposit on available surfaces, and thus on the mirror surface owing to that it is located very close to the surface of the inner metal region. The surface of the inner metallization should advantageously be diffusely reflecting in order to minimize ablation due to reflections of the laser beam.

Additional objects and advantages of the invention will be set forth in the description which follows, and in part will be obvious from the description, or may be learned by practice of the invention. The objects and advantages of the invention may be realized and obtained by means of the methods, processes, instrumentalities and combinations particularly pointed out in the appended claims.

BRIEF DESCRIPTION OF THE DRAWINGS

While the novel features of the invention are set forth with particularly in the appended claims, a complete understanding of the invention, both as to organization and content, and of the above and other features thereof may be gained from and the invention will be better appreciated from a consideration of the following detailed description of non-limiting embodiments presented hereinbelow with reference to the accompanying drawings, in which:

FIG. 5 is a partial sectional view similar to that of FIG. 1 of optical waveguide structures arranged on top of each other.

DESCRIPTION OF PREFERRED EMBODIMENTS

Figure 1:
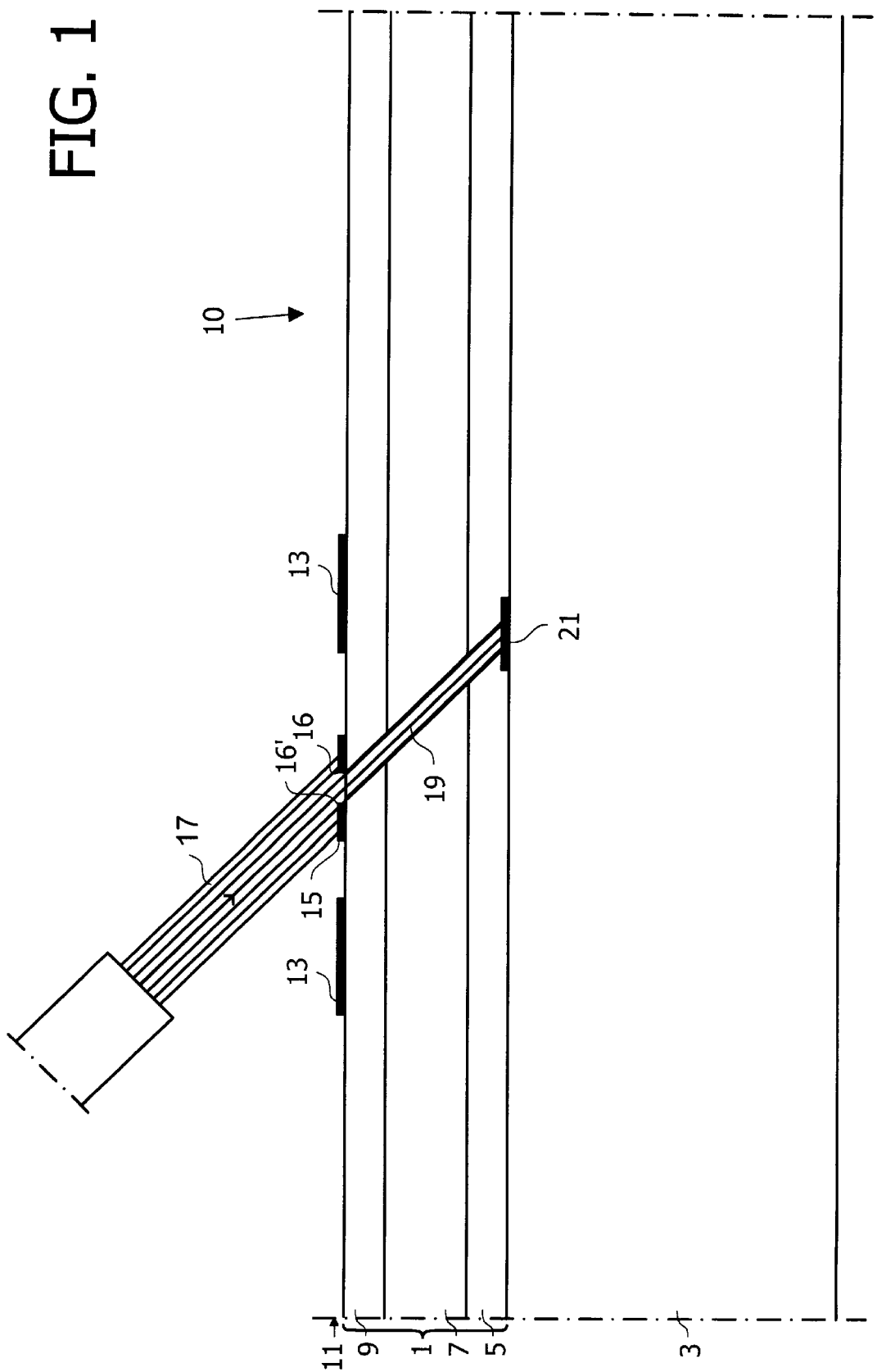
FIG. 1 is partial sectional view of an optical waveguide structure in which a reflector is formed.

In FIG. 1 a fragmentary cross-sectional view of a waveguiding structure 1 applied on a surface of a substrate 3 is shown. The substrate 3 can be made of a suitable plastics material. The light waveguiding structure 1 comprises three layers, an undercladding 5, a waveguide core layer 7 and an overcladding 9. All the waveguiding layers are assumed to is be made of suitable polymer materials. The polymer materials can be selected as suggested in M. Robertsson, A. Dabek, G. Gustafsson, O.-J. Hagel, M. Popall, "New Patternable Dielectric and Optical Materials for MCM-L/D and o/e-MCM-packaging", First IEEE Int. Symp. on Polymeric Electronics packaging, Oct. 26–30, 1997, Norrköping, Sweden, and the optical waveguide 10 can be forced as is disclosed in the simultaneously filed Swedish patent application "Optoelectric multichip module". On top of the overcladding 9 a metal layer 11 is applied which has been patterned to an accurately defined configuration, including soldering islands or pads 13 for connecting an optoelectric or electrooptic component, not shown, and electrical conductors, not shown, such as between the pads 13 and current supply or control circuits, not shown.

In addition to these areas the metal layer 11 includes a frame like structure 15 having an elongated opening defining the location, where a reflector of 45° is to be formed. The metal layer 11 and its different areas 13, 15 are also visible in the top view in FIG. 3. By directing a powerful laser beam 17 from a laser 18 in the desired angle to the surface of the structure 1 to hit the frame 15 and in particular the opening therein, an oblique recess or trench 19 can be formed. The laser beam 17 is located in relation to the long inner edges 16, 16', see also FIG. 3, of the frame 17 so that it hits at least one of these edges along which it can move in order to form the recess 19. The laser 18 producing the beam 17 can e.g. be an UV-excimer laser.

Figure 2:
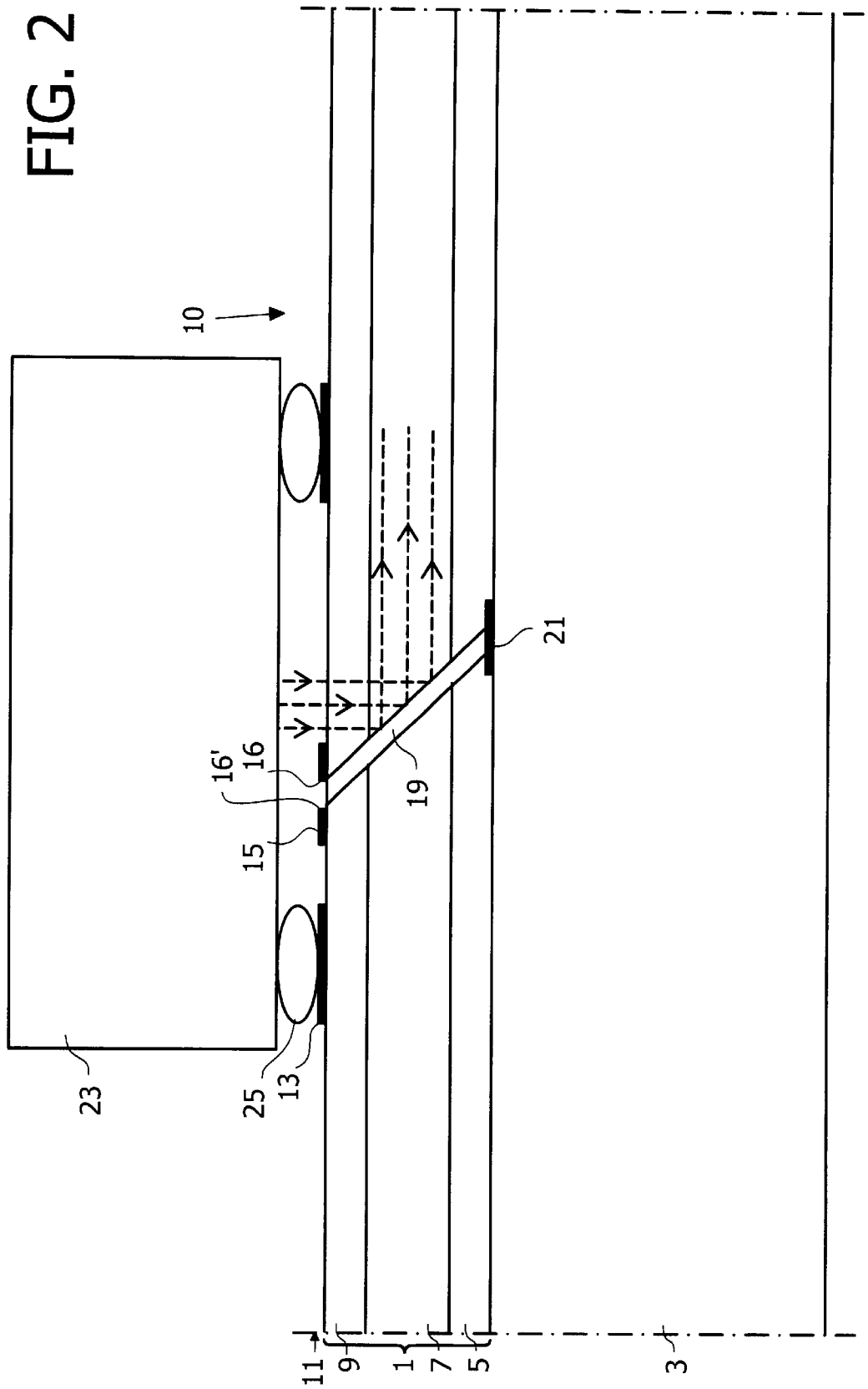
FIG. 2 is partial sectional view of the optical waveguide structure of FIG. 1, on which a surface-emitting laser is mounted.

At the border surface between the substrate 3 and the undercladding 5 a metal layer may have been applied and patterned. Then a portion 21 can be left at the bottom of the recess 19 in order to stop the laser beam, so that it cannot penetrate into the substrate 3. For suitable refractive indices of the materials in the layers forming the optical waveguide 10 and in particular in the waveguide core layer 7 at the upper one of the two parallel surfaces of the recess 19, which surfaces both have an angle of 45° in relation to the surface of the structure, hence also to the different layers and to the substrate, light propagating in the waveguide structure 10 can be reflected at the boarder surface to air out of the waveguide 10 to hit for example a light detector, not shown. The same reflecting surface can be used for injecting light in the waveguide if for example a light generating unit such as a surface emitting laser 23 is placed topside down above the reflector recess 19, as is illustrated in FIG. 2.

The component mounted on the surface, such as the surface emitting laser 23, is preferably aligned to or positioned in an accurately defined position using surface-tension forces of solder in solder balls or dots 25 applied at accurately defined positions to the bottom side of the component. These balls or dots 25 are when melted and when the component is placed at an approximate position adhering to and wetting the soldering pads 13, moving the component to the intended position in relation to the frame-like structure 15 and to the recess 19 and its reflecting surfaces. In that way the positioning of the component can be easily made, not requiring complicated aligning operations.

In order to make the reflecting surface less sensitive to dirt and pollution and in order to allow a refilling of the cavity or recess 19, the surface of the cavity recess 19 can be metallized. The cavity 19 can then be refilled by a sable material, for example a polymer cured by means of light, the polymer having a normal refractive index.

For a suitable material in the inner metal region 21 the metal can be evaporated when hit by the laser beam 17. The evaporated metal can then be deposited on adjacent surfaces, i.e. the surfaces inside the cavity 19 and also thus the surface which is to be used as a mirror for the light propagating in the waveguide structure. The surface of the metallization has advantageously a diffuse reflection of the light of the laser beam in order to minimize ablation due to the reflected beam.

Figure 3:
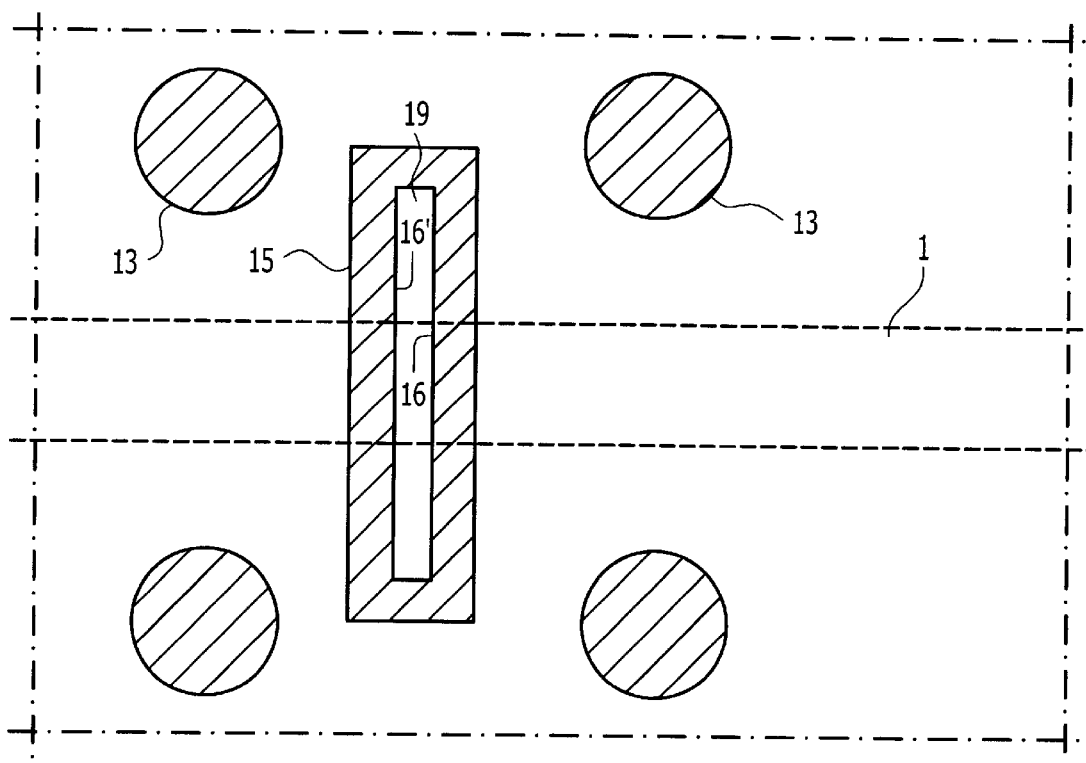
FIGS. 3 and 4 are top views of the multilayer structure forming the optical waveguide in two embodiments of a mirror-defining edge.

As is visible in FIG. 3 the frame-like structure 15 for defining the opening of the cavity 19 has in the simplest case two long parallel sides of metal material opaque to the light of the strong laser beam 17. Also end portions to close the frame can be arranged at the ends of these long, defining side portions. Only the position of that side-edge 16, 16' of a long parallel side of the frame 15 is important where the reflecting surface is to be formed. Thus, in the general case only one strip of masking metal material is required for positioning the reflecting side of the reflective recess accurately, the strip corresponding to a long side of the frame-like structure 15. The laser beam has then to be moved along the intended edge of the strip to hit the surface of the polymer structure at this edge, the laser staying at each position for a sufficiently long period until polymer material down to the substrate 3 has been ablated.

Figure 4:
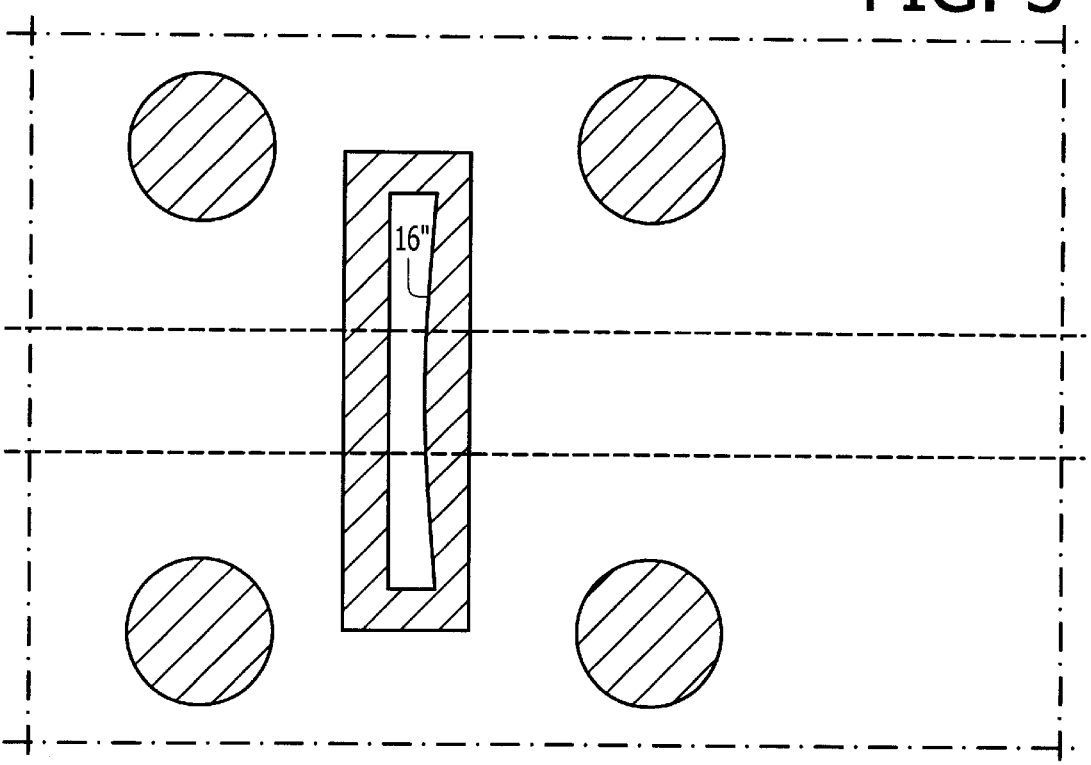

The inner edge of a long side of the frame-structure 15 can also be curved, as is visible at 16" in FIG. 4 in order to form a reflecting surface for example of a paraboloidal shape. Hence a focusing of the light propagating in the waveguide 10 which is to hit a photodetector element, not shown, can for example be obtained.

Multiple optical waveguide structures formed by e.g. a polymer structure 1' of the kind illustrated in FIGS. 1 and 2 located on top of an already formed bottom polymer structure 1 can also be obtained, as is illustrated in FIG. 5. Then contact pads 13 are only arranged in the top-most polymer structure 1'. Reflecting surfaces for light waves propagating in the waveguides of each individual structure are produced as above. Then first the under-most polymer structure including suitably arranged optical waveguides is produced, then mirrors in this structure and thereupon a new polymer structure on top of the already formed structure. When applying the first polymer layer in is new structure, the recesses 19 for the mirrors can be filed with the polymer material. Thereupon the reflecting recesses for the waveguides of the new structure are produced, et.

While specific embodiments of the invention have been illustrated and described herein, it is realized that numerous additional advantages, modifications and changes will readily occur to those skilled in the art. Therefore, the invention in its broader as is not limited to the specific details, representative devices and illustrated examples shown and described herein. Accordingly, various modifications may be made without departing from the spirit or scope of the general inventive concept as defined by the appended claims and their equivalents. It is therefore to be understood that the appended claims are intended to cover all such modifications and changes as fall within a true spirit and scope of the invention.

I claim:

1. A method of connecting a light generating or light receiving electrooptical or optoelectrical device to an optical waveguide formed in a surface layer of a substrate, the method comprising the steps of:

applying a metal layer on the surface, patterning the metal layer to form an edge of a region, the edge defining a location of a reflecting surface to be formed, and irradiating the surface at the edge using a laser beam to remove material in the surface layer so that a recess is formed having a light reflecting sidewall starting at the edge and extending into the surface layer, wherein, in the step of patterning the metal layer, the metal layer is further patterned to form metal bonding areas positioning the electrooptical or optoelectrical device in an accurately defined position in relation to the edge defining the location of the reflecting surface to be formed and thus to the light reflecting sidewall.

2. The method of claim 1, wherein, in the step of patterning the metal layer, the edge is given such a shape, that when irradiating the region, the sidewall of the recess obtains a correspondingly curved shape, which allows focusing of light propagating along the optical waveguide or which allows light to be injected in the optical waveguide to be shaped to a parallel beam.

3. The method of claim 1, wherein, before the step of irradiating the surface an interior metal layer is arranged inside the surface layer in a position below or inside the optical waveguide, so that when irradiating the surface with the laser beams the beam, after removing material in the optical waveguide, will hit the interior metal layer, whereby the material of the interior metal layer will be evaporated, sputtered or atomized and be deposited on the sidewall.

4. A method of connecting a light generating or light receiving electrooptical or optoelectrical device to an optical waveguide formed in a surface layer of a substrate, the method comprising the steps of:

arranging an interior metal layer inside the surface layer in a position below or inside the optical waveguide, applying a metal layer on the surface, patterning the metal layer to form an edge of a region, the edge defining a location of a reflecting surface to be formed, and irradiating the surface at the edge using a laser beam to remove material in the surface layer so that a recess is formed having a light reflecting sidewall starting at the edge and extending into the surface layer, so that when irradiating the surface with the laser beam, the beam, after removing material in the optical waveguide, will hit the interior metal layer, such that the material of the interior metal layer will be evaporated, sputtered or atomized and be deposited on the sidewall to form a diffuse reflective surface for propagating light in the recess, wherein, in the step of patterning the metal layer, the metal layer is further patterned to form metal bonding areas positioning the electrooptical or optoelectrical device in an accurately defined position in relation to the edge defining the location of the reflecting surface to be formed and thus to the light reflecting sidewall.

5. A method of making a reflector in an optical waveguide formed in a surface layer of a substrate, comprising the steps of:

arranging an interior metal layer inside the surface layer in a position below or inside the optical waveguide, applying a metal layer to a surface of the surface layer, patterning the metal to form an edge of a region, the edge defining a location of a reflecting surface to be formed, and irradiating the region at the edge using a laser beam to remove material in the surface layer to form a recess having a light reflecting sidewall, the recess and sidewall extending into the surface layer, so that when irradiating the surface with the laser beam, the beam, after removing material in the optical waveguide, will hit the interior metal layer, such that the material of the interior metal layer will be evaporated, sputtered or atomized and be deposited on the sidewall to form a diffuse reflective surface for propagating light in the recess, wherein, in the step of patterning the metal layer, the edge is given such a curved shape, that when irradiating the region the light reflecting sidewall of the recess will have a corresponding curved shape allowing focusing of light propagating in the optical waveguide or allowing that light to be injected in the optical waveguide is made to a parallel beam.

6. A method of making a reflector in an optical waveguide formed in a surfaces layer of a substrate, comprising the steps of:

irradiating the surface using a laser beam to remove material in the surface layer so that a recess is formed having a light reflecting sidewall extending into the surface layer, and placing, before irradiating the surface, a metal layer inside the surface layer at a position below or inside the optical waveguide, the position being selected so that in the step of irradiating the surface the laser beam will, after removing material in the optical waveguide, hit the metal layer, whereby the material of the metal layer will be evaporated, atomized or finely dispersed and be deposited on the light reflecting sidewall to form a diffuse reflective surface for propagating light in the recess.

* * * * *